Jan. 27, 1970  KENICHI OWAKI ET AL  3,492,531
NON-UNIFORM MAGNETIC FIELD TYPE ELECTRON
CURRENT GENERATING DEVICE
Original Filed June 21, 1965  2 Sheets-Sheet 2

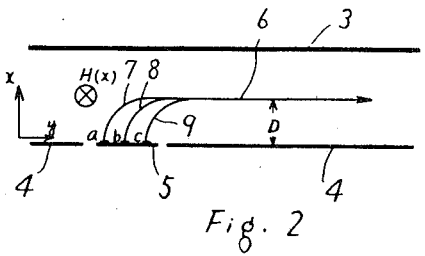

INVENTORS
KENWICHI OWAKI
NORIHIKO NAKAYAMA
YOSHIO IMAHORI
BY
ATTORNEY

United States Patent Office 3,492,531
Patented Jan. 27, 1970

3,492,531
NON-UNIFORM MAGNETIC FIELD TYPE ELECTRON CURRENT GENERATING DEVICE
Kenichi Owaki, Akashi-shi, and Norihiko Nakayama and Yoshio Imahori, Kobe, Japan, assignors, by mesne assignments, to Fujitsu Limited, Kanagawa-ken, Japan, a company of Japan
Continuation of application Ser. No. 465,538, June 21, 1965. This application Jan. 22, 1968, Ser. No. 703,513
Claims priority, application Japan, June 27, 1964, 39/36,686
Int. Cl. H01j 11/04, 13/48
U.S. Cl. 315—326                                     3 Claims

ABSTRACT OF THE DISCLOSURE

An electron beam generator utilizing mutually perpendicular electric and magnetic fields and wherein said magnetic field has a nonuniform characteristic.

---

This invention is a continuation of United States patent application Ser. No. 465,538, now abandoned, filed June 21, 1965, entitled Non-Uniform Magnetic Field Type Electron Current Generating Device.

This invention relates to electron beam generating devices and more specifically to a novel and improved electron beam generator utilizing perpendicular electric and magnetic fields.

In electron beam generating devices such as cathode ray tubes, traveling wave tubes, velocity modulated tubes, electron accelerators, and the like, an electron gun employing an electrostatic lens has been utilized in which the electron emitting element was perpendicular to the direction of the resultant electron beam. This procedure has not been particularly satisfactory because of the relatively low current density. Another method heretofore utilized employed a plate-like cathode as the electron emitting element and mutually perpendicular electric and magnetic fields, but this method has also been found to be disadvantageous because of the relatively low current density of the generated beam and the inability to finely focus the beam.

This invention overcomes the disadvantages of prior known structures and, while utilizing mutually perpendicular electric and magnetic fields, utilizes the fields in a manner that will produce a stable orbit of electrons in accordance with the Betatron "2 for 1 rule" by providing a non-uniform magnetic field of a specific character between the electrostatic field generating elements, it is possible to focus electron beams of substantially large current densities.

Another object of the invention resides in the provision of novel and improved means for generating and focusing electron beams.

A still further object of the invention resides in the provision of a novel and an improved electron beam generating device embodying a non-uniform magnetic field.

The above and other objects of the invention will become more apparent from the following description and accompanying drawings forming part of this application.

In the drawings:

FIGURE 1 is an explanatory diagram to illustrate a fundamental aspect of the invention for attaining a stable electron orbit.

FIGURE 2 is a diagrammatic illustration of an electron beam generating device in accordance with the invention.

FIGURE 3 is a graph illustrating the conditions under which a stable electron orbit is attained in accordance with the invention.

FIGURE 4 is a schematic diagram of a linear cathode ray tube embodying an electron beam generating device in accordance with the invention.

FIGURE 5 is a modified form of cathode ray tube in accordance with the invention.

FIGURE 6 is a fragmentary view in partial section illustrating a modified form of beam generating device in accordance with the invention.

FIGURE 7 is a cross-sectional view of FIGURE 6 taken along the line 7—7 thereof.

Figure 8:
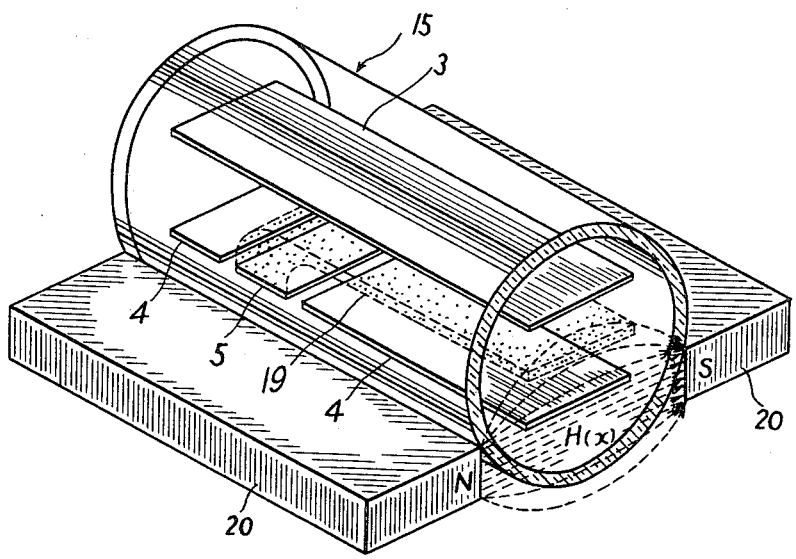
FIGURE 8 is an enlarged fragmentary section in perspective of the structure shown in FIGURE 5.

Referring now to FIGURE 1, let it be assumed that a magnetic field H $(r)$ is generated in a direction perpendicular to the surface of the paper and which has an intensity varying from the center O in a radial direction therefrom and as a function of the radius $r$. From the following Equation 1, which is the "2 for 1 rule," it will be observed that electrons 1 emitted from the center O will converge onto the circumference 2 and will continue in a stable orbit about said circumference:

$$\int_0^r H(r) \cdot r \cdot dr = H(r) \cdot r^2 \tag{1}$$

The "2 for 1 rule" is discussed in Electricity and Magnetism by Duckworth (1960) and is derived in the following manner:

From Faraday's law of electromagnetic induction $$E = \frac{1}{C}\frac{d\phi}{dt} \tag{1-1}$$

According to Ampere's law $$\vec{F} = e\frac{(\vec{v} \times \vec{B})}{C} \tag{1-2}$$

It is well known that $$\vec{B} = \mu \vec{H} \tag{1-3}$$

Applying Newton's law to the radial force results in the following equation:

$$\frac{evH(D)}{C} = \frac{mv^2}{D} = ma \tag{1-4}$$

$$mv = \frac{eDH(D)}{C} \tag{1-5}$$

Thus Equation 1–5 gives the tangential momentum required for the electrons to orbit at radius D under magnetic field H(D).

Applying Newton's law to the tangential force, it is found that:

$$e\vec{\nabla}E = \frac{e}{2\pi DC}\frac{d\phi}{dt} = \frac{d(mv)}{dt} \tag{1-6}$$

where $\phi$ is the flux within the circumference of the circle of radius D. Integrating from $\phi=0$ and $mv=0$, it is found that:

$$mv = \frac{e\phi}{2\pi DC} \tag{1-7}$$

Equation 1–7 gives the tangential momentum gained by an electron moving from the center out to the orbit distance D. If the momentum given by (1–5) is equal to that given by (1–7), then the electrons will continue to orbit at radius D. Thus setting (1–5) and (1–7) equal, the condition for the magnetic field required for a stable orbit is found below.

$$\frac{eDH(D)}{C} = \frac{e\phi}{2\pi DC} \tag{1-8}$$

$$\varphi = 2\pi D^2 H(D) \tag{1-9}$$

By definition:

$$\phi(D) = \int_0^D H(r) 2\pi r \, dr \quad (1\text{-}10)$$

where $\phi$ is all of the flux within the circle of radius D.
Then $$\phi(D) = \int_0^D H(r) 2\pi r \, dr = 2\pi D^2 H(D) \quad (1\text{-}11)$$

and $$\phi(D) = \int_0^D H(r) r \, dr = D^2 H(D) \quad (1\text{-}12)$$

Equation 1-12 is the Betatron "2 for 1 rule." By way of clarification assume that $H(r)$ is a constant, $H_{(average)}$ then $$\phi = \frac{H_{(average)} D^2}{2} = D^2 H(D) \quad (1\text{-}13)$$

and $$H_{(average)} = 2H(d) \quad (1\text{-}14)$$

Thus it is seen that average magnetic field from O to D is equal to twice the field at D. Therefore the designation "2 for 1 rule."

If the electron emitting source is not at the center O of the circular orbit 2 shown in FIGURE 1 but on a circumference having a radius $r_1$, then the lower limit of Equation 1 would be $r_1$. Inasmuch as there is no theoretical limit to the value $r$, it can therefore be made relatively large, and, under such conditions, a limited portion of the stable orbit 2 can be assumed to be substantially linear. It also follows that, if the electrons are emitted from a circle having a radius $r_1$, then the electrons will move in an annular orbit having a width $(r-r_1)$. If this annular portion is extended horizontally and a magnetic field distribution is provided within the band-like space $(r-r_1)$ and in the manner described in connection with FIGURE 1, then the electrons will move in a horizontal path. In this way, a stable linear electron orbit is produced as will become more evident from the following description of the structure shown in FIGURE 2.

In FIGURE 2, which embodies an electron beam generating device in accordance with the invention, electrons are emitted from a plate-like cathode 5. An anode 3 disposed in parallel spaced relationship to the cathode 5 is energized with a voltage $V_1$. Electrode 4 having portions on each side of the cathode 5 as shown in FIGURE 2 receives a voltage $V_0$ which is lower than the voltage $V_1$. The portions of electrode 4 are also in substantially parallel relationship to the anode 3. The voltages $V_0$ and $V_1$ produce an electric field $E(x)$ in the space therebetween. In addition to the electric field, a magnetic field $H(x)$ is generated within the space and in a direction perpendicular to the surface of the paper. This magnetic field may be of high intensity in the vicinity of the electrode 4 and gradually decreases in intensity toward the anode 3. Under certain conditions, it may be desirable to reverse this non-uniform distribution of the magnetic field, in which case it will then be necessary that the electrons have an appropriate velocity so that they will be directed toward the anode 3. The magnetic field varies as a function of a distance $x$ from the electrode 4 toward the electrode 3. Under this condition and with the coordinate system illustrated in FIGURE 2, the motion of the electrons in the space between the electrode 4 and the anode 3 can be represented in general by the following equations:

$$\frac{dx^2}{d^2 t} = \frac{eE(x)}{m} - \frac{eH(x)}{m} \frac{dy}{dt} \quad (2)$$

$$\frac{d^2 y}{dt^2} = \frac{eH(x)}{m} \frac{dx}{dt} \quad (3)$$

$$\frac{d^2 z}{dt^2} = 0 \quad (4)$$

where $e$ is charge of electrons, and $m$ is mass of electrons.

According to the foregoing equations and assuming $H(x)$ is constant, then the electrons will move from left to right in the drawing along a cycloidal path. When $H(x)$ is properly applied, then the electrons will define a linear orbit as illustrated by the line 6 of FIGURE 2. The conditions for attaining this stable orbit are determined by the following equation which is the Betatron "2 for 1 rule" as previously described:

$$\int_0^x H(x) \cdot x \cdot dx = H(x) \cdot x^2 \quad (5)$$

With the determination of $H(x)$, Equation 5 is solved for the value of $x$ (wherein $x$ is the distance D of the beam 6 from the electrode 4) which is the position of the stable electron orbit. Reversely, a magnetic field distribution $H(x)$ can be determined by selecting a specific value for $x$. For example, let it be assumed that the magnetic field distribution $H(x) = ax + b$. By solving Equation 5, the following equation is then obtained:

$$\tfrac{2}{3} ax^3 + \tfrac{1}{2} bx^2 = 0 \quad (6)$$

When a specific stable orbit position is substituted for $x$ in Equation 6, the desired magnetic field distribution is obtained. At this point, however, it is necessary to choose an absolute value of intensity of the magnetic field so that the electron beam will not be influenced by the earth's magnetism. For this purpose, a proportional constant K represented by $H^1(x) = K(ax + b)$ may be utilized.

FIGURE 3 is a graph which illustrates three types of magnetic field distribution lines 10, 11 and 12. The line 13 of the graph represents the left side of Equation 5, while the curve 14 represents the right side of Equation 5. The intersection of the line 13 with the curve 14 determines the value D which is equal to $x$.

If the stable orbit distance D from the electrode 4 is 1 cm., then the values $a$ and $b$ which will satisfy the condition $x = D = 1$ cm. are $a = -3$ and $b = 4$. (The fact that $a$ is negative indicates that the intensity of the magnetic field is weaker in the vicinity of the anode 3). Thus, under the condition that the magnetic field distribution is $H(x) = -3x + 4$, a stable orbit will be produced at the distance of 1 cm. from the electrode 4. In this case, the intensity of the magnetic field on the orbit is $H(l) = 1$ gauss which is relatively small. Under these conditions, the proportional constant $K = 66$ and $H'(1) = 66$ gauss.

The voltage V required for the aforementioned conditions can be assumed to be substantially equivalent to a critical value which is given to the electrons moving within the magnetic field intensity adjacent the electron orbit $(R = D)$ which has a radius of 1 cm. The voltage V may be determined by the following equation:

$$\sqrt{v} = \frac{HR}{3.3} \quad (7)$$

wherein:

H is the intensity of the magnetic field,
R is the radius of the electron orbit, and
V is the voltage on said orbit.

From the above equation and assuming that $V = 400$ volts and the spacing between the elements 3 and 4 of FIGURE 2 is 2 cm., then the voltage between the electrodes is $V_1 - V_0 = 800$ volts.

Equation 7 above is derived in the following manner. The electric field component E within the space is represented by the following equation 7-1 where $v$ is the scalar potential:

$$E(x) = -\frac{\partial v}{\partial x} \quad (7\text{-}1)$$

The magnetic field component H is represented by the following equation with the vector quantity Ay being taken in the y direction:

$$H(x) = \frac{\partial A_y}{\partial x} \text{ (with } A_x = 0\text{)} \quad (7\text{-}2)$$

According to Laplace's equation $$\frac{\partial^2 v}{\partial x^2} = 0 \quad (7\text{-}3)$$

and according to Maxwell's equation $$\frac{\partial^2 A_y}{\partial y^2} + \frac{\partial^2 A_y}{\partial z^2} = 0 \quad (7\text{-}4)$$

From the foregoing the equations for the movement of electrons can be derived as follows:

$$\frac{d^2 x}{dt^2} = \frac{e}{m} \cdot \frac{\partial v}{\partial x} - \frac{e}{m} \cdot \frac{dy}{dt} \cdot \frac{\partial A_y}{\partial x} \quad (7\text{-}5)$$

and $$\frac{d^2 y}{dt^2} = \frac{e}{m} \cdot \frac{dx}{dt} \cdot \frac{\partial A_y}{\partial x} \quad (7\text{-}6)$$

In this instance the acceleration $d^2z/dt^2$ which the electrons receive in the z direction is zero. Thus Equation 7-6 can be rewritten as (7-7) while Equation 7-8 can be obtained from the initial condition of $x=0$ and $$\frac{dy}{dt} = 0$$

at $t=0$ and by integrating with respect to time:

$$\frac{d^2 y}{dt^2} = \frac{e}{m} \cdot \frac{dA_y}{dt} \quad (7\text{-}7)$$

and $$\frac{dy}{dt} = \frac{e}{m} [A_y(x) - A_y(0)] \quad (7\text{-}8)$$

If $$\frac{dx}{dt} = 0$$

at $x=0$ and $t=0$, the following equation can be obtained energy integration:

$$\left(\frac{dx}{dt}\right)^2 + \left(\frac{dy}{dt}\right)^2 = 2\frac{e}{m} \cdot v^1 \quad (7\text{-}9)$$

from Equations 7-8 and 7-9

$$\left(\frac{dx}{dt}\right)^2 = 2\frac{e}{m} v - \left(\frac{e}{m}\right)^2 [A_y(x) - A_y(0)]^2 \quad (7\text{-}10)$$

Integrating from $0-x$ then $$t = \pm \int_0^x \frac{dx}{\sqrt{2\frac{e}{m} v - \left(\frac{e}{m}\right)^2 [A_y(x) - A_y(0)]^2}} \quad (7\text{-}11)$$

Now since $dy/dt$ can be expressed as $$\frac{dy}{dt} = \frac{dx}{dt} \cdot \frac{dy}{dx} \quad (7\text{-}12)$$

then $dy/dx$ can be derived from Equations 7-8 and 7-10 in the following manner:

$$\frac{dy}{dx} = \pm \frac{\frac{e}{m}[A_y(x) - A_y(0)]}{\sqrt{2\frac{e}{m} v - \left(\frac{e}{m}\right)^2 [A_y(x) - A_y(0)]}} \quad (7\text{-}13)$$

Integrating Equation 7-13, it is found that:

$$y - y_0 = \pm \int_0^x \frac{\frac{e}{m}[A_y(x) - A_y(0)] dx}{\sqrt{2\frac{e}{m} v - \left(\frac{e}{m}\right)^2 [A_y(x) - A_y(0)]}} \quad (7\text{-}14)$$

Equations 7-11, 7-13 and 7-14 define the movement of electrons in terms of time and distance in the $x$ and $y$ directions. In order to produce a stable orbit in the space through which the electrons move, a condition must be established that there is a point along the y direction at which the speed of the electrons in the x direction emitted from the cathode becomes zero and the acceleration also becomes zero. Thus a condition that $$\frac{d^2 x}{dt^2} = 0 \text{ and } \frac{dx}{dt} = 0$$

when $X=D$ must be satisfied. Introducing the condition $$\frac{dx}{dt} = 0$$

in Equation 7-10, it is found that $$2V(D) = \left(\frac{e}{m}\right)[A_y(D) - A_y(0)]^2 \quad (7\text{-}15)$$

The condition $$\frac{d^2 x}{dt^2} = 0$$

when introduced in Equation 7-5 gives $$\left[\frac{\partial v}{\partial x}\right]_{X=D} = \frac{e}{m}[A_y(D) - A_y(0)]\left[\frac{\partial A_y}{\partial x}\right]_{X=D} \quad (7\text{-}16)$$

Now since the electric field E is constant the following relation may be established from Equation 7-15:

$$-2E \cdot D = \frac{e}{m}[A_y(D) - A_y(0)]^2 \quad (7\text{-}17)$$

and rewriting Equation 7-16 gives $$E_{X=D} = \frac{e}{m} A_y(D) - A_y(0)] H(D) \quad (7\text{-}18)$$

Combining Equations 7-17 and 7-18 gives $$2H(D)D = -[A_y(D) - A_y(0)] \quad (7\text{-}19)$$

Further from Equation 7-2 the following relationship may be obtained:

$$\int_0^x H(x) \cdot dx = -[A_y(x) - A_y(0)] \quad (7\text{-}20)$$

From the Equations 7-19 and 7-20 it is apparent that a condition for a stable orbit can be defined as:

$$\int_0^D H(x) \cdot dx = 2H(D)D \quad (7\text{-}21)$$

Equation 7-21 corresponds to the Betatron "2 for 1 rule" as previously discussed and is a preferred form for determination of the magnetic field for establishing a stable linear path.

It follows that the electric field to establish a stable orbit at $X=D$ is:

$$E_{X=D} = -\frac{e}{m} H(D) \int_0^D H(x) dx \quad (7\text{-}22)$$

and therefore $$E = -2\frac{e}{m} H(D)^2 D = -\frac{V}{D} \quad (7\text{-}23)$$

and $$\sqrt{V} = \sqrt{2\frac{e}{m}} H(D)D \quad (7\text{-}24)$$

For practical applications Equation 7-23 can be written as follows:

$$\sqrt{V} = \frac{H(D)D}{K} \quad (7\text{-}25)$$

which corresponds to Equation 7.

When the desired non-uniform magnetic field distribution is produced between the electrodes 3 and 4 as shown in FIGURE 2, a stable electron path is produced in accordance with the Betatron "2 for 1 rule" provided, however, that the critical voltages are applied to the electrodes 3 and 4. Under these conditions, the electrons emitted from the cathode 5 toward the anode or element 3 will move in paths about individual centers but will all finally converge into a stable orbital path which produces a highly focused electron beam.

From the foregoing description, it is evident that the length of the cathode does not affect the establishment of a stable orbit, and therefore, relatively long cathodes can be employed and all of the emitted electrons can be converged into the same orbit to produce a relatively high electron current density. For example, if the current density of the electrons from an oxidized cathode is 0.5 a./cm.$^2$, the maximum current derivable from a cathode having a diameter of 2 mm. is 15.7 ma. If a cathode having a width of 2 mm. and a length of 20 mm. is utilized, an electron current of 200 ma. can be produced.

FIGURE 4 illustrates an example of a cathode ray tube employing the invention. The tube includes the elements 3 and 4 and the cathode 5, all as described in connection with FIGURE 2. This electron generating means is included within a suitable envelope 15 and utilizes vertical and horizontal beam deflection elements 15 and 17. The front end of the envelope 15 is closed and carries a fluorescent or phosphorescent screen 19. It is to be understood that a magnetic field is produced between the elements 3 and 4 as also described in connection with FIGURE 2.

With the structure shown in FIGURE 4, the electrons emitted from the cathode cannot be focused but in one direction, namely, perpendicular to the drawing, and it is therefore necessary to utilize a narrow elongated cathode extending in the direction of the axis of the tube in order to provide a sufficiently narrow beam.

FIGURES 5 and 8 illustrate a cathode ray tube which enables the utilization of a cathode of substantial area while at the same time enabling the resultant electron beam to be sharply focused. More specifically, a portion of the envelope 15 is formed at right angles to the remainder of the envelope, and this offset neck portion contains the so-called electron gun including the cathode 5 and elements 3 and 4. Voltages are applied to the elements as described in connection with FIGURE 2, and a magnetic field H(x) is produced by the magnets 20 disposed on either side of the envelope neck and in the vicinity of the gun. A second pair of magnets 21 are disposed in the vicinity of the bend in the envelope 15 and electrostatic deflection plates are provided for deflecting the beam denoted in this figure by the numeral 19. The face of the envelope 15 carries a suitable fluorescent or phosphorescent screen 18.

The magnetic elements 20 produce a field between the anode 3 and the electrodes 4 of a non-uniform character as described in connection with FIGURE 2. The electron beam generated by the cathode 5 and focused by the elements 3 and 4 and the magnets 20 produces a very narrow ribbon-like beam which travels upwardly toward the bend in the envelope 15. The magnets 21 produce a field which is substantially perpendicular to the field formed by the magnets 20 and the distribution is so arranged that the intensity increases from the lower side as shown in FIGURE 5 to the upper side. As pointed out above, the electron beam projected toward the bend of the tube is in the form of a thin ribbon. These electrons are caused to move through an angle of 90° in the plane of the ribbon-type beam and this procedure causes the beam to be converged into the new stable orbit or beam 19. The width is substantially decreased, and a relatively fine beam of high intensity travels toward the fluorescent screen 18.

FIGURES 6 and 7 illustrate modified form of the invention utilizing a hollow electron beam generating device. More specifically, the numeral 23 denotes a large cylindrical anode which surrounds a small cylindrical low voltage electrode 24 and a cylindrical cathode 25. The electrodes 24 and 25 are aligned in an axial direction and are arranged concentrically within the electrode 23. This form of the invention corresponds to the structure shown in FIGURE 2, except that it is in a cylindrical form. The elements 23 through 25 are contained within an envelope 26, and an electromagnetic coil for the formation of a magnetic field surrounds the envelope. This coil, denoted by the numeral 28, is in the form of a solenoid having an elongated winding. The magnetic field is formed in the direction of the arrows shown in FIGURE 7 between the anode 23 and the electrodes 24 and 25 and its intensity is greater in the vicinity of the electrodes 24 and 25. By properly selecting the strength of the magnetic field and the voltage applied to the electrodes, a cylindrical stable electron orbit is produced in the space between the electrodes 23 and 24. The electrons emanating from the cathode travel in an axial direction and in the form of a thin cylindrical beam. The stable orbit is cylindrical and having substantially zero thickness. This effect cannot be attained by devices such as magnetic injection apparatus or the like.

It is to be understood that the numerical values and the specific structures, such as cathode ray tubes, utilized in the foregoing description are merely for the purpose of explanation with respect to specific application of the invention and are not to be construed as limiting the invention to any specific application or applications. The invention is clearly applicable to all electron devices requiring the generation of electron beams.

What is claimed is:

1. An electron current generating device of the non-uniform magnetic field type comprising an elongated anode, a low potential electrode and a cathode coplanar with said electrode, said electrode and cathode being positioned in spaced parallel relationship to said anode, means applying a high potential to said anode and a low potential to said electrode to produce an electric field between said anode and electrode, and means producing a magnetic field H(x) having an intensity varying as a function of the distance x from said electrode and in the direction of said anode, said magnetic field being perpendicular to the direction of said electric field, said high and low potentials being selected to produce a voltage at a given position between said anode and said electrode, said voltage having a critical value with respect to electrons moving at said position, said magnetic field being based on the Betatron "2 for 1 rule" as exemplified by the equation $$\int_0^x H(x) \cdot x \cdot dx = H(X) \cdot X^2$$

where X is said position; and said voltage is determined by the equation $$\sqrt{V} = \frac{HR}{K}$$

where K is a constant and R=X.

2. An electron current generating device according to claim 1 wherein the intensity of said magnetic field H(x) decreases from said electrode to said anode.

3. An electron current generating device according to claim 1 wherein the intensity of said magnetic field H(x) increases from said electrode to said anode.

(References on following page)

References Cited

UNITED STATES PATENTS

| | | | |
|---|---|---|---|
| 2,680,823 | 6/1954 | Dohler et al. | 313—156 X |
| 2,760,101 | 8/1956 | Reverdin | 313—156 X |
| 3,092,745 | 6/1963 | Veith et al. | 313—84 |
| 3,259,789 | 7/1966 | Kluver | 315—39.3 |

JAMES W. LAWRENCE, Primary Examiner

P. C. DEMEO, Assistant Examiner

U.S. Cl. X.R.

313—84, 156; 315—39.3